Figure 1:
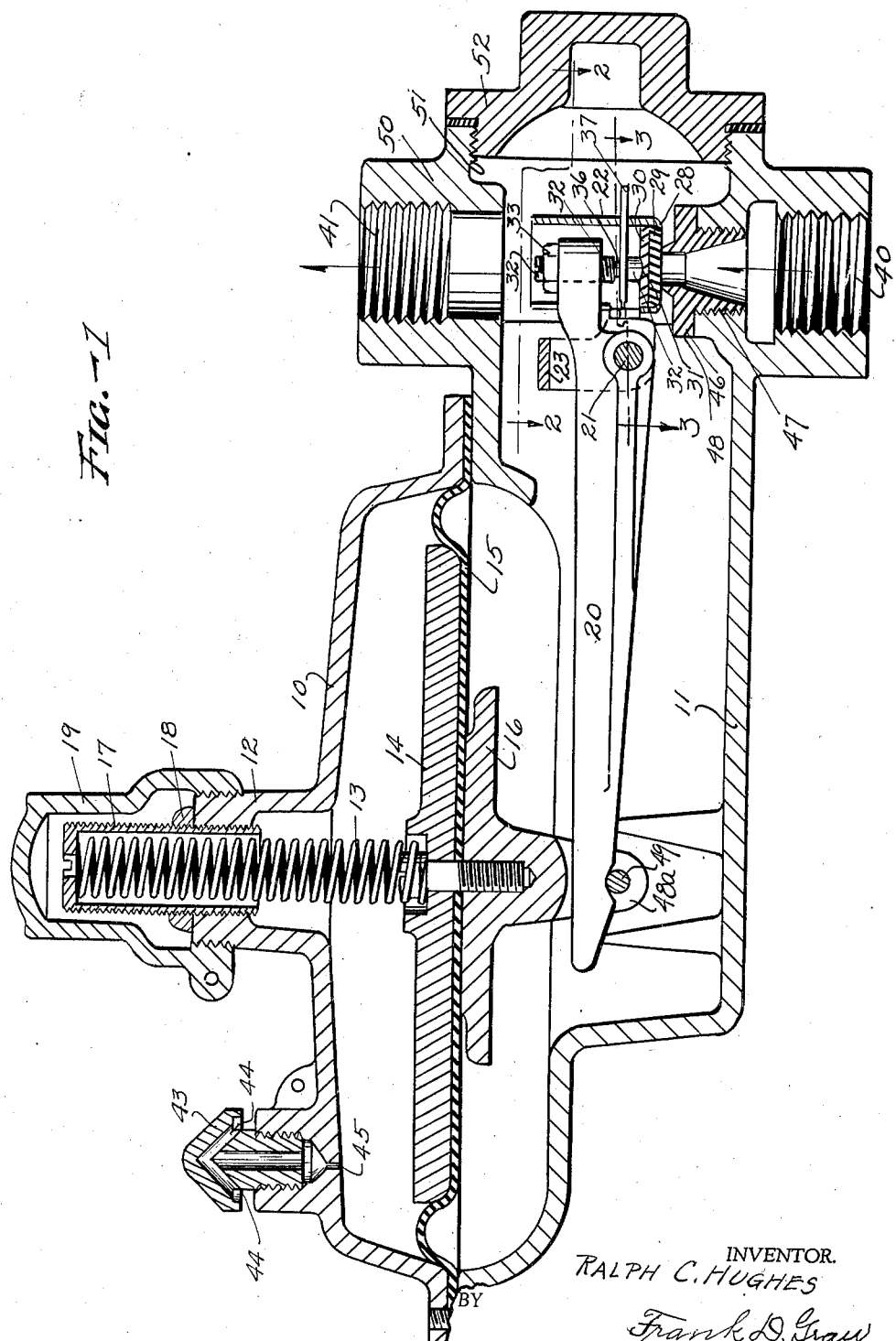

April 26, 1938.  R. C. HUGHES  2,115,580
PRESSURE REGULATOR
Filed Sept. 12, 1936  2 Sheets-Sheet 1

INVENTOR.
RALPH C. HUGHES
BY Frank D. Gray
ATTORNEY.

April 26, 1938.    R. C. HUGHES    2,115,580
PRESSURE REGULATOR
Filed Sept. 12, 1936    2 Sheets-Sheet 2
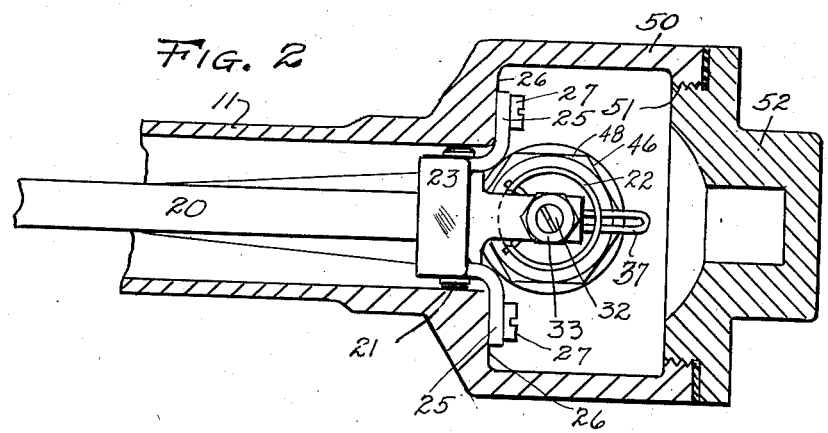
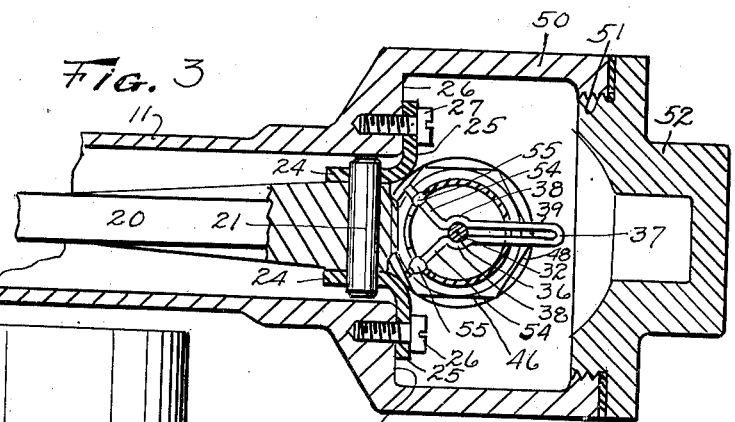
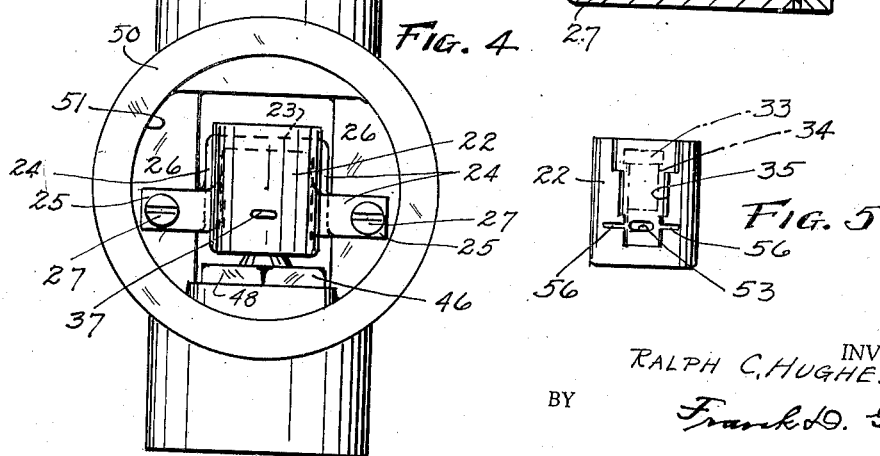
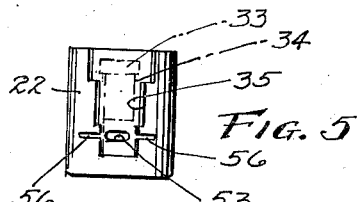
INVENTOR.
RALPH C. HUGHES
BY Frank D. Gray
ATTORNEY.

Patented Apr. 26, 1938

2,115,580

UNITED STATES PATENT OFFICE 2,115,580

PRESSURE REGULATOR

Ralph C. Hughes, Anderson, Ind., assignor to Reynolds Gas Regulator Co., Anderson, Ind., a corporation of Indiana Application September 12, 1936, Serial No. 100,489

6 Claims. (Cl. 50—26)

This invention relates to improvements in pressure regulators, and particularly to those types of pressure regulators adapted to maintain a uniform pressure in gas service lines irrespective of the fluctuations of the gas pressure in the supply lines.

The general object of the present invention is to provide an efficient pressure regulator which will be economical to manufacture and easy to assemble.

Another object is to provide a pressure regulator with an improved form of valve mechanism which may easily be adjusted or even replaced without removing the regulator from the service lines.

A further object of this invention is to provide a pressure regulator with an improved valve member which may easily be replaced from the exterior of the valve without the use of special tools and wherein the entire valve mechanism together with its seat and operating arm may be removed from the regulator without necessitating the disconnection of the regulator from the service or main gas lines, and wherein suitable adjustment is provided in such mechanism to enable replacements to be made of the parts thereof without endangering the effectiveness of the regulator.

Other objects of this invention will become more apparent from the following description, reference being had to the accompanying drawings in which I have illustrated a preferred embodiment of my invention. The novel and essential features of the invention will be summarized in the claims.

Referring now to the drawings: Fig. 1 is a vertical longitudinal section of a pressure regulator embodying my invention; Figs. 2 and 3 are fragmentary horizontal sections as indicated by the correspondingly numbered offset lines on Fig. 1; Fig. 4 is an end elevation, looking at the right hand end of the structure shown in Fig. 1, certain parts being removed to more clearly illustrate the internal construction of the regulator; Fig. 5 is an elevation of the valve member removed from the regulator.

As shown in the drawings the regulator comprises an upper casing 10 and a lower casing 11 between which is clamped a flexible diaphragm 15. The lower casing extends beyond the upper casing (to the right in Fig. 1), and is there provided with vertically aligned inlet and outlet ports 40 and 41, suitably threaded to be connected with the gas main and service lines respectively.

The central region of the diaphragm is clamped between disc like members 14 and 16 in the usual manner. The upper casing 10 is provided with a vertical extension 12 into which is threadingly inserted an inverted sleeve 17, forming a socket for a valve spring 13, the lower end of which engages the diaphragm disc 14. The pressure is adjusted by screwing the sleeve 17 in or out thereby adjusting the pressure exerted by the spring 13 on the diaphragm. A suitable lock nut 18 locks the sleeve in the desired position while an adjusting screw cap 19 is removably secured to the casing extension 12 and may be locked in position in the usual manner to prevent tampering with the adjusting mechanism.

The area above the diaphragm is vented to atmosphere by a vent 43 provided with downwardly opening passageways 44 communicating with the interior of the casing 10 as indicated at 45. The lower side of the diaphragm comprises a pressure chamber and is in open communication with the outlet port 41 at all times.

The inlet port 40 is provided with a removable valve seat 46 which is threading securing to the casing 11 as shown in Fig. 1 at 47 and is preferably provided with a hexagonal shoulder 48 adapted to be engaged by a suitable wrench to permit removal and replacement of the seat.

The inlet port 40 is opened and closed under control of the pressure within the pressure chamber of the casing 11. As indicated in Fig. 1 the diaphragm disc 16 is provided with a downwardly projecting bifurcated extension 48ª carrying a pivot pin 49 which coacts with one end of a valve lever 20 pivoted intermediate its ends, on a horizontal pivot 21 as will hereinafter be more fully described. The other end of this lever cooperates with a valve member 22 to open and close the valve inlet 40.

My improved regulator is so constructed that the lever 20, its pivot 21 and the valve 22 may be removed from the regulator without disturbing the gas connections thereto. As shown in the drawings the extension 50 of the casing 11 is provided with an end opening 51 normally closed by a threaded plug 51 which may be removed in the usual manner to permit removal of the valve operating mechanism above mentioned.

The valve lever pivot rod 21 is pivotally mounted in a bracket 23. As shown in Figs. 1 and 2 this bracket comprises an inverted U shaped plate the downwardly extending legs 24 of which support the pivot 21, and are provided with outwardly turned ears 25 adapted to be secured to inner walls 26 of the casing extension 50 by screws 27. The arrangement is such that these screws may be removed after removal of the plug 52 and the entire lever assembly then withdrawn from the regulator.

While the arrangement is such that the entire valve and valve lever assembly may be removed from the regulator as a unit, I nevertheless find it advantageous to so arrange the valve that it may be removed from the lever without removal of the valve lever.

As shown in the drawings the valve 22 comprises an open ended cylinder, the lower edges of which are bent inwardly as indicated at 28 in Fig. 1 to support a valve disc 29 which may be leather, rubber or fiber as desired. Above the valve disc 29 I insert a bearing disc 30 provided with a cup like depression 31 adapted to coact with the rounded head of an adjusting screw 32 threadingly carried by the outer end of the valve lever 20. Thus the downward pressure on the valve disc 29 is positive. The adjusting screw 32 is locked in position by a lock nut 33. Both the screw and nut are accessible from the opening 51.

The valve supporting end of the lever 20 has a substantial cross sectional area as indicated by the dotted lines 34 shown in Fig. 5 to provide strength and rigidity so that the valve disc may be firmly and securely forced against its seat. Hence the valve cylinder 22 is provided with an enlarged opening 35 in its side wall as indicated in Fig. 5.

The valve assembly 22 is removably secured to the screw 32 heretofore described as carried by the lever 20. As shown in Fig. 1, the screw 32 has an annular reduced portion 36 adapted to be embraced by a wire clip 37. This clip, as illustrated in Fig. 4, is Y shaped, and is provided with arcuate gripping portions 38 arranged to grip the reduced portion of the screw 32. The looped leg 39 of the clip extends outwardly, through a suitable opening 53 in the valve cylinder 22 where it may be conveniently grasped by the operator when the plug 52 has been removed and drawn outwardly by the operator. The other two legs 54 of the clip are bent outwardly and are each provided with a flattened portion 55 which engage restricted slots 56 in the valve cylinder 22. The unflattened tips of the clip legs 54 prevent removal of the clip from the valve cylinder when in position on the screw 32.

It will be noted from Fig. 3, that the legs 54 of the clip abut the wall of the cylinder 33 at the ends of the slots 56, and the looped portion 39 of the clip substantially fills the opening 53 in the cylinder hence the clip is retained in snug contact with the screw 32 preventing any inadvertent displacement due to the constant intermittent movement of the valve.

The clip 37 is sufficiently resilient to permit the valve cylinder to be shoved into position on, or pulled from the screw 32 by the operator, as well as to permit the drawing together of the legs 54 of the clip and thus permit removal of the clip from the cylinder. However the clip is of such strength that it will not give in a vertical direction during the actuation of the valve.

From the foregoing it will be seen that I have provided a simple and efficient pressure regulator wherein the valve, the valve lever and the valve lever pivot may be removed as a unit without disconnecting the service connections to the regulator. Likewise the valve may be removed without removal of the valve lever and wherein an adjustment is provided between the valve and the valve lever to compensate for wear or variations in the cooperating parts.

Having herein set forth the principles of my invention and described and illustrated an embodiment thereof for practical use, what I claim and desire to secure by Letters Patent is,—

1. A valve assembly comprising a hollow cylinder having an inturned flange, a valve closure disc supported by said flange, a valve lever, said cylinder having a slot in its wall to receive said lever, a stud adjustably carried by said lever within said cylinder, and means removably carried by said cylinder to removably connect said cylinder with said stud.

2. In a pressure regulator, a pressure actuated valve lever, a pivotal connection therefor, a stud threadingly carried by said lever and extending therebelow, a cylinder having one end closed by a valve member and having a slot in its wall to receive said lever, said stud having an annular reduced portion, a clip removably secured to said cylinder and adapted and arranged to coact with the reduced portion of said stud to removably attach the valve member to said lever.

3. A valve assembly comprising a hollow cylinder having an inturned flange at one end thereof, a valve closure disc adapted and arranged to be positioned in said cylinder in contact with said flange, a valve lever, said cylinder having a slot in its wall to receive said lever, a stud adjustably carried by said lever and extending axially in said cylinder, and means removably carried by said cylinder to removably connect said cylinder with said stud and simultaneously maintain said closure disc in contact with said flange.

4. In a pressure regulator, a valve assembly comprising a hollow cylinder having an inturned flange, a valve closure disc supported by said flange, a pressure disc superimposed on said closure disc, a valve lever extending into said cylinder, a stud adjustably carried by said lever and extending axially into said cylinder and means removably carried by said cylinder to retain said stud in contact with said pressure disc, said last named means including a wire clip adapted to engage the cylinder at three points, means to removably retain said clip in position on said cylinder, and wherein said clip is provided with a portion adapted and arranged to embrace said stud.

5. A valve assembly comprising a hollow elongated cylinder having a side wall provided with a vertically extending slot and transversely extending openings, an inwardly turned flange at the bottom end of said cylinder and integral therewith, a valve closure disc within said cylinder and supported by said flange, a rigid pressure disc within said cylinder above the closure disc, each of said discs being axially slidable in said cylinder to permit their removal through the upper end thereof, a valve lever extending into the cylinder through the slotted side wall thereof, a stud adjustably supported by said lever and projecting downwardly therefrom, a spring removably carried in the openings of the cylinder wall and removably coacting with the stud to retain the cylinder in axial alignment with said stud, and wherein the wall of the cylinder extends upwardly substantially enclosing said stud.

6. A valve assembly comprising an elongated open-ended cylindrical shell having a wall provided with a vertically extending slot and a pair of transversely extending slots communicating therewith, an inwardly turned flange at the bottom end of said shell and integral therewith, a valve closure disc within said shell and supported by said flange, a rigid pressure disc within said shell, each of said discs being axially slidable in said shell to permit their removal through the upper end thereof, a valve lever extending into said shell through the vertically extending slot, a pin carried by said lever and projecting downwardly therefrom and having an annularly extending recess, a looped wire spring embracing said stud in the region of said recess, and having its ends flaring outwardly and provided with flattened portions adapted to enter the transversely extending slots in the wall of said shell, said shell having a slot adapted to receive the looped end of said wire whereby said spring, said shell and said discs are removable as a unit from said stud, and said spring and discs may thereafter be removed from said shell.

RALPH C. HUGHES.